A. H. HOFFMAN.
ART OF CHARGING STORAGE BATTERIES.
APPLICATION FILED APR. 3, 1917.
1,362,794.
Patented Dec. 21, 1920.
2 SHEETS—SHEET 2.
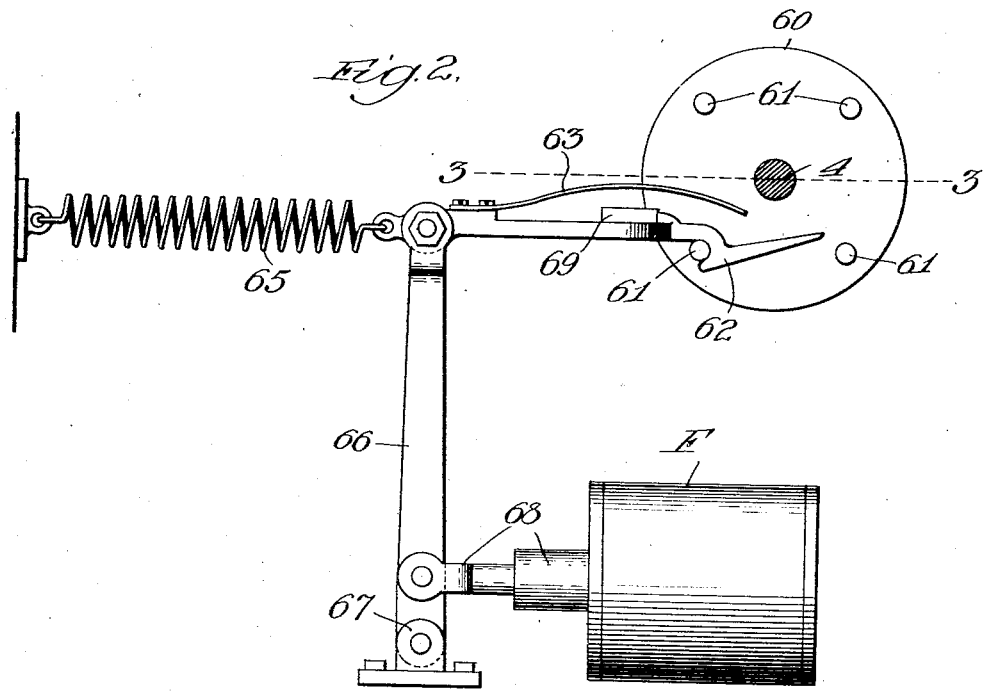
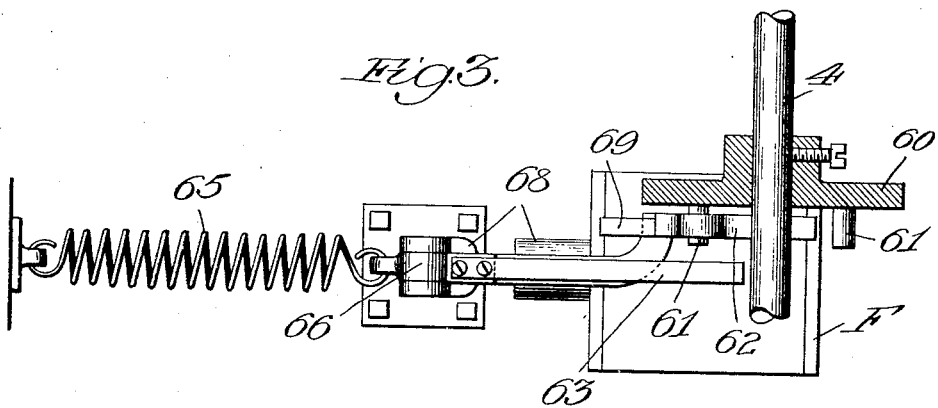

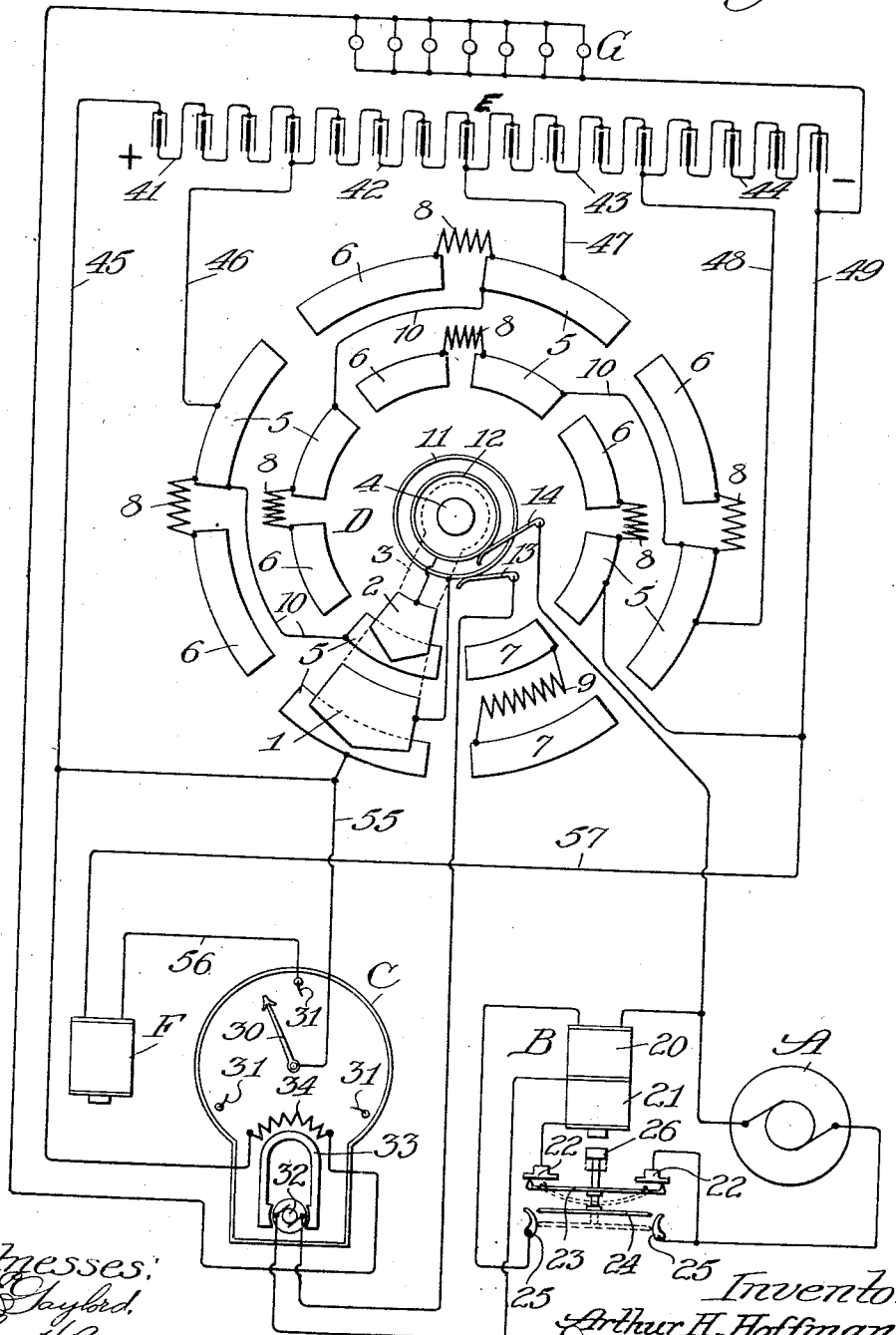

UNITED STATES PATENT OFFICE.

ARTHUR H. HOFFMAN, OF AMES, IOWA.

ART OF CHARGING STORAGE BATTERIES.

1,362,794.  Specification of Letters Patent.  Patented Dec. 21, 1920.

Application filed April 3, 1917. Serial No. 159,467.

*To all whom it may concern:*

Be it known that I, ARTHUR H. HOFFMAN, a citizen of the United States, residing at Ames, in the county of Story and State of Iowa, have invented a new and useful Improvement in the Art of Charging Storage Batteries, of which the following is a specification.

My invention relates to the art of charging storage batteries and consists in the procedure and apparatus hereinafter described.

The principal object of the invention is to render it possible to charge a storage battery from a generator driven by a relatively small and inexpensive windmill or other variable speed variable power prime mover in such a manner as to provide sufficient electrical energy to light satisfactorily the average farmstead. The results obtained by means of the invention herein described are:

Use of full power of mill at all wind speeds above a certain very low minimum.

Equal charging of all cells.

Prevention of danger to cells from excessive charging rates.

Maintenance of practically constant voltage on service line whether battery is charging or not; hence obviating the need of counter E. M. F. cells and end cell switches, at the same time increasing the useful life of lamps served by the circuits.

Automatic operation.

Figure 1 shows a diagrammatic view of the electrical circuits.

Fig. 2 shows a plan view of the mechanism which I prefer to use to give step-by-step rotation to the contactors of switch D.

Fig. 3 shows a section on line 3, 3 of Fig. 2.

In Fig. 1, A is a direct current generator of any suitable type driven by any prime mover, more particularly by a windmill or any other variable speed prime mover. Prime mover is not shown.

B is any suitable kind of circuit breaker and restorer preferably having a shunt coil 20; a series coil 21; an armature 26; a resilient bar 23 of suitable slightly flexible conducting material, carried by armature 26 and adapted to close and open the charging circuit at points 22, 22; a second bar 24 also carried by armature 26 and adapted to close and open the circuit of shunt-coil 20 across the terminals of generator A at 25, 25, as shown. Bar 24 maintains circuit of shunt coil closed on generator until charging current through series coil 21 rises sufficiently to cause armature 26 to be attracted so strongly that bar 24 is drawn past and out of contact at 25, 25 while at the same time resilient bar 23 is drawn into very close contact at points 22, 22.

C is an ampere-hour meter having in addition to the usual armature 32 and field magnet 33, an extra field coil 34 responsive to the discharge current only and having its relative number of turns and polarity such that the changes in meter readings due to the discharge current factor in the generator circuit will be counterbalanced. The ampere-hour meter C is of the "compensated" type, that is to say, it does not record the whole ampere-hours output of the generator, but only that part which charges the sections of the battery, excluding the part which feeds the service circuit G, Fig. 1. The meter C has the usual permanent horse shoe magnet, producing a field in which the armature of the meter revolves. The extra field coil 34 is of such number of turns, dimensions and placing with regard to the meter armature that, whenever current is being used in the service circuits G at the same time that the generator is giving current, the magnetic field produced by the service current, as it flows through the coil 34, may be added to the permanent field of the meter. This serves to slow down the motion of the meter armature in proportion to the decrease in the part of the generated current which goes to charge the battery. If the parts of the meter are rightly proportioned, the meter armature will revolve at a rate proportional at all times to the rate at which the charge enters the battery. The coil 34 can produce an effect only when the generator is giving current. The purpose of the described arrangement is to make absolutely equal the ampere-hours given in partial charge in succession (rotation) to the several sections of the battery, regardless of whether the generator gives a current large, small, steady or unsteady, and whether the service current is large, small or zero. By this arrangement the charge-meter C accurately measures the charging current only regardless of the load or discharge current of the battery. The meter C has its needle 30 insulated from main current circuit and arranged to engage with and pass over one or more stationary contacts 31 thereby to close an electrical circuit after a measured electric charge has passed through.

D is a distributing switch consisting of a positive charging contactor 1, a negative charging contactor 2, a single arm 3 of suitable insulating material to which the aforesaid contactors are rigidly fastened, a shaft 4 carrying said arm, two similar sets of stationary contacts having as axis the said shaft and arranged to permit of engagement with the said contactors as the latter revolve step by step on the shaft as an axis, and certain resistances, cross-connectors, sliprings and brushes as hereinafter specified. The stationary contacts are of three kinds, namely, main contacts 5, passover contacts 6 well known from their use in end cell switches, and end passover contacts 7 so called from the fact that two of the four adjacent main contacts are connected to the positive and negative ends respectively of the whole battery. A suitable resistance 8 connects each passover contact 6 with an adjacent main contact 5. A suitable resistance 8 connects the two end passover contacts 7. Cross connectors 10 electrically connect certain main contacts 5 as shown. The number of main contacts 5 in each circle of contacts equals the number of groups 41, 42, 43, 44 into which the battery E is divided. The number of passover contacts 6 in each circle of contacts is equal to one less than the number of groups 41, etc. into which the battery is divided. There is one end passover contact 7 in each circle of contacts. For the sake of clearness in illustration the two circles of contacts are shown as outer and inner circles lying in the same plane. In practice, however, they may be arranged in any appropriate manner. Electrical connection between contactors 1 and 2 and generator A may be maintained by two properly insulated sliprings 11 and 12 carried by shaft 4 and supplied with suitable brushes 13 and 14 after the well-known method. The functions of resistances 8 used with passover contacts 6 are well known from functions of analogous construction in end cell switches. The resistance 9 together with end passover contacts 7 forms a means to prevent shortcircuiting of the whole battery, of the generator, or of both together, and to prevent opencircuiting of the generator circuit under load with consequent arcing and fusing of tips of contactors and of contacts, when contactors pass forward from last group of cells on the negative end of battery to first group on positive end. This arrangement has the merit of avoiding the more complex mechanism that would be needed to bring contactors quickly by reverse motion back to first cell group on positive end.

E is a storage battery connected in series at all times ready for use, and for charging purposes placed in any suitable number of similar groups 41, 42, 43, etc., containing in each any desired number of cells. From each end of the series and from between each two adjacent groups of cells a wire 45, 46, 47, 48, 49 runs to its appropriate main contact 5 of the switch D.

F, Figs. 1, 2, and 3, is a direct current electromagnet arranged to turn the shaft 4 of D with a step-by-step motion by means of the device shown in Figs. 2 and 3 in which 68 is the armature of the magnet F acting on lever 66. Lever 66 is pivotally supported at one end by 67 and at the other carries a hook 62. Said hook is attached at one end to a coiled spring 65 and carries a flat spring 63. A stop 69 limits the motion of hook 62 and therefore the angular motion of disk 60. Disk 60 is rigidly attached to shaft 4 and carries on one surface projections 61 equally spaced in a circle concentric with shaft 4. The projections 61 are in number equal to the number of groups 41, 42, etc., into which the battery is divided. Thus at each deënergizing of the magnet F contactors 1 and 2 will be moved from one pair of main contacts 5 over the intervening passover contacts 6 (or end passover contacts 7) to the next adjacent pair of main contacts 5. The direction of rotation may be either clockwise (chosen for purposes of illustration herein) or counter-clockwise, as determined by the mechanical construction employed. The device shown in Figs. 2 and 3 is typical of several toothed wheel or pawl and ratchet devices any one of which might be used instead.

G represents the service lines which may at all times be left connected to the terminals of the battery through the usual fuses and service switch (not shown).

Operation is as follows: When armature speed of generator A, Fig. 1, becomes sufficient to produce a certain voltage (its value depending on the number and type of storage cells in each group 41, 42, etc., of battery E), the armature 26 of circuit breaker and restorer B will be attracted sufficiently to cause bar 23 to close circuit on terminals 22, 22, and after a further increase in current to cause the bar 23 to be fixed from the dotted line position shown in Fig. 1 to the full line position, and to cause the bar 24 to open circuit of shunt coil 20 at 25, 25. The positive charging current will flow from the positive terminal of generator A through bar 23 and series coil 21 of circuit breaker and restorer B, through ampere-hour meter C, to distributer switch D by way of brush 13 on slipring 11 to positive contactor 1 and main contact 5 beneath it, by wire 45 to and through group 41 of battery E, through wire 46 to attached main contact 5, through its cross-connector 10 to main contact 5 under negative contactor 2, through slipring 12 and brush 14 through connecting wire to negative terminal of generator A. When a certain charge measured by ampere-hour meter C has passed through group 41 of battery E, needle 30 of ampere-hour meter C closes circuit at a contact point 31 causing magnet F to be energized by current from battery E flowing through wires 55, 56 and 57. Magnet F through the device shown in Figs. 2 and 3 causes rotation of shaft 4 and with it arm 3 bearing contactors 1 and 2, in, let us say, clockwise direction, causing said contactors 1 and 2 to slide over the next adjacent pair of passover contacts 6, and into engagement with the next adjacent pair of main contacts 5, thereby causing cell group 42 to start charging. Similarly, when needle 30 subsequently comes into engagement successively with contacts 31, magnet F operates to put each group of cells in the battery successively into the charging circuit. The quantity of electricity passing between successive engagements of needle 30 with a contact 31 is chosen a relatively small fraction of the total charge required to fill the battery; hence, even though the current density on the plate area of the cells rises to a very high value, all danger of overheating and other destructive tendencies is avoided by the relatively long rest period enjoyed by each cell group in the interval between successive relatively brief charging periods. By proper choice of the number of cell groups the maximum temperature rise under standard air temperature conditions, under the maximum charging rate possible for the prime mover to produce, may be made less than any desired value.

Similarly by increasing the number of cell groups, the increase of terminal voltage on service lines G when charging commences may be made small enough to be unobjectionable for all ordinary uses.

The charges put into all cell groups will be equal, being so measured, regardless of whether charging current is large or small, steady or unsteady, or even intermittent. Slight inequalities in condition of cells due to higher efficiency of charging at low current densities (presupposing lead cells) are largely smoothed out in the course of a few days' charging and are entirely eliminated at each customary overcharging. Hence, all cells having received the same treatment, all may be expected to have substantially the same length of useful life.

While I have shown and described in considerable detail one method by which my invention may be carried out together with a preferred form of apparatus, it will be understood that this is illustrative only and that my invention is not limited to such details, except in so far as such limitations are included within the terms of the accompanying claims in which it is my intention to claim all novelty inherent in my invention as broadly as is permissible in view of the prior art.

What I claim as new and desire to secure by Letters Patent is:—

1. A charge-distributing system for charging storage batteries by windmills and the like variable speed, variable power, prime movers, comprising a generator driven by the prime mover, a plural cell storage battery, the units of which are connected in series, a distributing switch comprising relatively movable contacts and contactors, connections between the contacts and the units of the said battery, said connections dividing the battery into a plurality of equal groups of cells, an ampere hour meter, electro-magnetic means controlled by the said meter for effecting relative movement of the contacts and contactors, a low voltage circuit breaker, operating from said generator, and connections between said generator, meter and contactors, said connections being controlled by said circuit breaker.

2. A distributing switch for charging storage batteries and comprising two looped series of contacts, the intermediate contacts of each series being connected intermediate the length of the battery to be charged, and one end of each series being connected with one end of the said battery, end passover contacts lying between the ends of the two loopd series, a resistance connecting the two end passover contacts, a contactor adapted to travel over the contacts of each series and the said end passover contacts, the width of the contactor being greater than the gap between the end passover contact and the adjacent contacts of the series, means for moving said contactors simultaneously over said end passover contacts, and means connecting said contactors with a source of charging current.

3. A distributing switch for charging storage batteries and comprising a set of contacts arranged in a circle and adapted for connection with sections of a battery, a central shaft, a contactor mounted on the shaft to travel over the said contacts, a series of eccentric pins arranged in a circle concentric with the said shaft and carried thereby, the angular spacing of the said pins corresponding to the angular spacing of the said contacts, a hook mounted for reciprocation in a transverse plane through the said pins, a limit stop for the said hook, and means controlled by the charging current for actuating the said hook.

4. A distributing switch for charging storage batteries and comprising a set of contacts adapted for connection with sections of a battery, contactors mounted to travel over said contacts, a series of pins associated with said contactors spaced apart corresponding to the spacing of said contacts, a member mounted for reciprocation in a transverse plane with respect to said pins, a stop for said member, and means controlled by the charging current for actuating said member.

5. In combination, a plural cell storage battery, a variable power, variable voltage generator, and a charge distributing switch connecting the generator with sections of said battery, said switch comprising two looped series of contacts, the intermediate contact of each series being connected intermediate of the length of the battery to be charged, and one of each series being connected with one end of said battery, and passover contacts lying between the ends of the second looped series, a resistance connecting the two end passover contacts, a contactor adapted to travel over the contact of each series and the said end-passover contacts, the width of the contactor being greater than the gap between the end passover contact and the adjacent contact of the series, and means connecting said contactor with a source of charging current.

ARTHUR H. HOFFMAN.